June 13, 1939.  F. B. ADAM  2,162,341
ELECTRIC HEATER
Filed Feb. 4, 1937  2 Sheets-Sheet 1
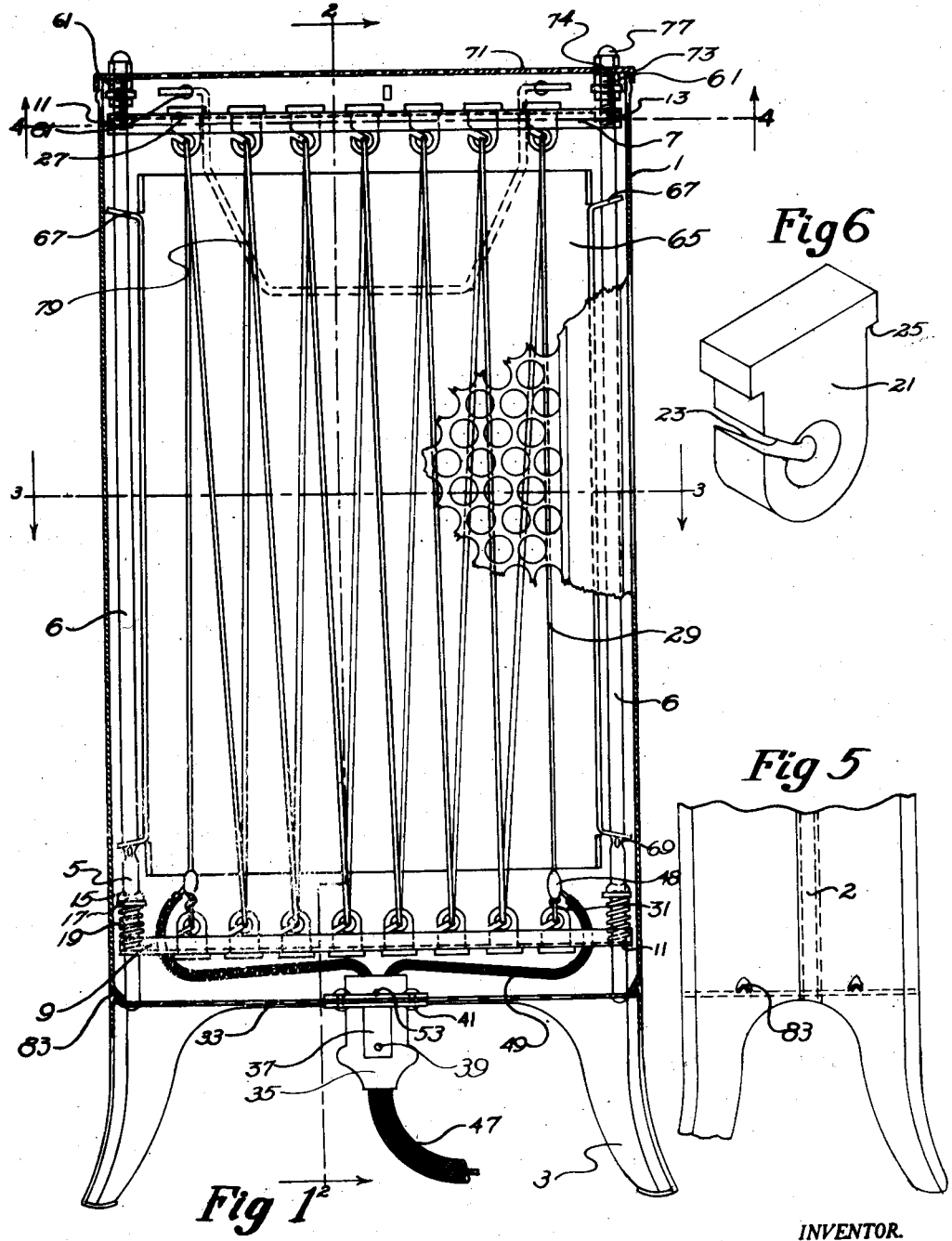
INVENTOR.
Frederick B. Adam
BY
Roy M. Eilers
ATTORNEY.

June 13, 1939.                F. B. ADAM                2,162,341
                            ELECTRIC HEATER
                         Filed Feb. 4, 1937          2 Sheets-Sheet 2
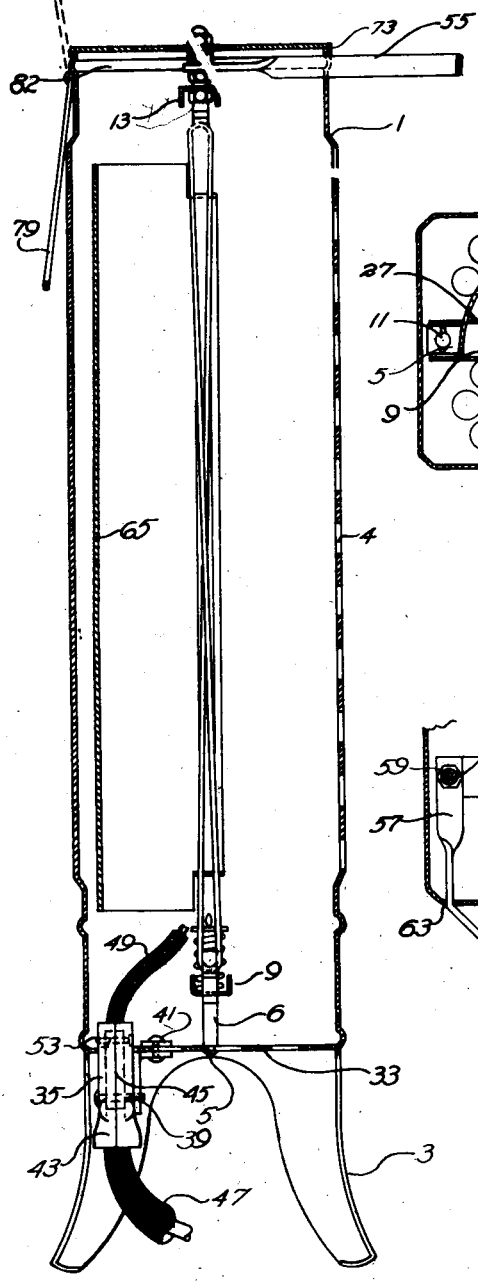
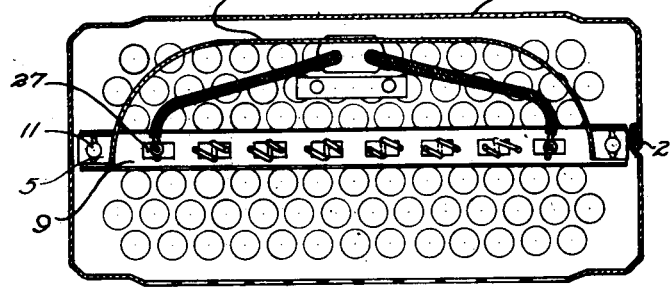
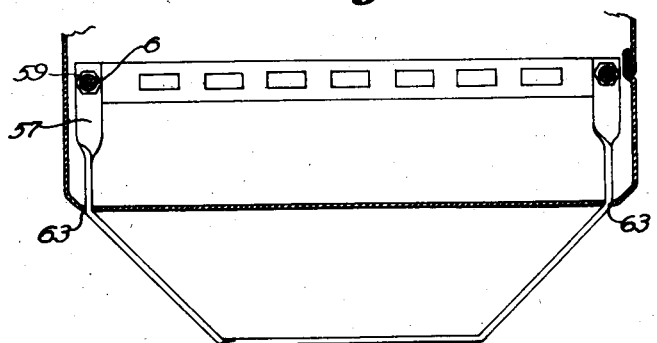
INVENTOR.
Frederick B. Adam
BY
Roy M. Eilers
ATTORNEY.

Patented June 13, 1939

2,162,341

UNITED STATES PATENT OFFICE 2,162,341

ELECTRIC HEATER

Frederick B. Adam, St. Louis County, Mo., assignor to Frank Adam Electric Company, St. Louis, Mo., a corporation of Missouri Application February 4, 1937, Serial No. 124,159

2 Claims. (Cl. 219—34)

This invention relates to electric heaters and more particularly to the portable circulation type of heater.

In an electric heater the rate of heat transfer from the heater element to the surrounding air is proportional to the amount of exposed heater element surface. For this reason an electric heater exposing the greater heater element surface at a given temperature will be the more efficient. Many conventional types of heaters use elements of the coil type which act as springs to compensate for the contraction and expansion of the heater element wire which would otherwise cause the heater element to sag at operating temperatures. This coil type of heater element does not, however, expose as large an effective area to the circulating air as a straight wire type of heating element does.

An object of this invention is to provide an electric heater utilizing a straight wire heating element with means to compensate for the expansion and contraction of the wire.

Yet another object of the invention is to provide a heater element carrying assembly which may be assembled and adjusted independently of the heater enclosing means.

Still another object of this invention is to provide a simple and effective means of supporting the heater element, reflector, and insulators, with a minimum of parts.

Other objects and advantages will appear from the following detailed description and accompanying drawings.

In the drawings:

Fig. 1 is a vertical front sectional view of the heater.

Fig. 2 is a vertical side sectional view of the heater along line 2—2 of Fig. 1.

Fig. 3 is a sectional view along line 3—3 of Fig. 1,

Fig. 4 is a sectional view along line 4—4 of Fig. 1,

Fig. 5 is a fragmentary side elevation of the heater, and

Fig. 6 is an enlarged perspective view of a type of insulator which may be used in the heater.

Referring to the drawings, the numeral 1 designates the heater casing which may be formed from a single piece of sheet metal and held together by a seam 2, or may be constructed by assembling a front and rear pre-shaped section, and securing them by seams, welds, or other suitable means. The feet 3 of the heater casing are integral with the casing and may be pressed from the metal at the time of shaping the heater casing. The front of the casing shown is provided with perforations 4 which allow the heated air to pass through the front of the casing. If so desired, the sides and rear of the heater casing or portions thereof may likewise be perforated.

The numeral 5 designated a heater element carrying assembly which may be assembled, and the parts thereon adjusted before the entire assembly is placed into the casing. The heater element carrying assembly is composed of two vertical supports 6 which are round and have the upper portions thereof threaded, as shown in the drawing, but may be of rectangular or other convenient shape in cross section. These vertical supports are bridged by an upper channel member 7 and a lower channel member 9, both of which may be of U shaped cross section as shown in the drawings or other suitable cross section. Both upper and lower channel members are provided with openings 11 which are of the proper size to allow the channel members to slide on the vertical supports. The upper channel member may be positioned on the vertical supports by nuts 13 which cooperate with the threaded portions of the vertical supports.

The lower channel member may be positioned on the vertical supports by means of extruded portions 15 of the vertical supports, washers 17 and springs 19. The extruded portions of the vertical support may be formed by a die; a copper pin, clamp, or other means which will maintain the springs and lower channel member in position may be used instead.

A form of insulator which may be employed to support the heater element wire yet to be described is designated by the numeral 21. The insulator is provided with a slot 23 and a shoulder 25 and may be composed of some ceramic or other heat resisting insulating material.

Openings 27 are provided in both the upper and lower channel members and are of such a shape as to allow the insertion of the insulators therein. In the form shown in the drawings, the insulator cross section and opening are of a rectangular shape, the shoulders on the insulators serving to position them in the openings.

The numeral 29 designates the heater element wire, which may be round or rectangular in cross-section, and is strung between the insulators on the top and bottom channel member. The wire must be strung so that when it is cold a tension is produced in the springs 19 allowing the springs to expand and move the lower channel member to compensate for expansion of the heater element wire when hot. One method of stringing the heater element wire is to determine the proper shape and length thereof by experiment, make a form which will produce such a shaped heating element when the wire is strung thereon, and use the form to shape the heating element which may then be placed in the slots of the insulators. Loops 31 may be formed in the ends of the heater element wire and serve to secure it on the insulators.

At the lower end of the vertical supports a perforated plate 33 may be secured by means of headed portions of the vertical supports. This perforated plate serves to position the entire heater element carrying assembly in the casing.

A housing 35 of insulating material is secured to the perforated plate by means of an angle 37, bolt 39 and rivets 41. The insulated housing is similar to a type used on heater appliance cords and is composed of two symmetrical sections 43, each provided with recesses 45 which form a passage for the wires when the two sections are placed together. The ends of a heater cord 47 are spliced to the ends of the heater element leads 49 which are brazed to the heater element wire at 48. The splices are positioned in the passages formed between the two insulating housing sections and the heater cord is gripped tightly by the housing sections when they are drawn together. A bolt 53 serves to draw the two housing sections together while the bolt 39 serves to secure the housing to the angle 37 as well as draw the sections of the housing together.

The numeral 55 designates a guard which serves to protect any surface on which the heater is standing in the event of the heater being knocked over on its face. The guard will then serve to maintain sufficient distance between the heating element and the surface so as to prevent the surface taking fire. In the drawings the guard as shown is of rectangular cross-section and has end portions 57 twisted 90 degrees with respect to the main portion thereof. Holes 59 are provided in the end portion of the guard so that it may be slipped on the vertical support members 6 where it is held in place by nuts 61 cooperating with the threaded portions of the vertical supports. Openings 63 are provided in the casing to allow the guard to pass through the front face thereof.

A reflector 65 of polished metal may be provided to reflect some of the heat produced by the heating element through the front of the heater in a more or less horizontal direction, giving the heater a directional effect which may sometimes be desired. The reflector is curved as shown by its cross sectional view in Fig. 3. Portions of the reflector are cut and turned down to form lugs 67 which are provided with suitable holes to allow the reflector to slip over the vertical supports 6 and be supported thereby. Extruded portions 69 of the vertical supports are provided to maintain the reflector in proper position on the vertical supports. The above described reflector may be omitted if so desired, although its use greatly improves the radiating and directional properties of the heater.

A perforated top plate 71 is provided to complete the heater casing. It is provided with a flanged portion 73 around its outer edge which cooperates with the side walls of the casing in maintaining the shape of the casing and presenting a neat and finished appearance. Openings 74 are provided in the top plate to allow the end portions of the vertical supports 6 to pass therethrough. Nuts 77 cooperate with the threaded portions of the vertical supports to secure the top plate in place as well as to maintain the heater carrying assembly 5 in proper position with regard to the heater casing. A handle 79 for carrying the heater may be provided on the rear of the heater. Pieces of spring steel 82 are positioned as shown in Fig. 2, that is, across the top of the heater to press the sides of the heater apart and against the flanges 73 of the perforated top 71.

The numeral 83 designates portions of the heater casing which are punched in to form stops. The lower perforated plate 33 may be drawn up against these portions by tightening the nuts 77 thus positioning the entire heater element carrying assembly in the casing.

A convenient method of assembling the heater consists in separately assembling the entire heater element carrying assembly and the heater casing with associated parts and then inserting the heater element carrying assembly into the casing, placing the spring steel member 82 in position, then placing and securing the top perforated plate 71 and drawing up the bottom perforated plate against the punched in portions 83 by tightening the nuts 77.

In operation, the air which is heated around the heater element, rises through the perforated top plate into the room while the cold air from the lower part of the room enters the heater through the lower perforated plate. A natural convection system is thus established and even the more remote portions of the room are reached by the warm air currents. The reflector serves to reflect radiant heat from the heating alement through the front perforated portion of the heater and thus furnishes a strong local source of heat for any object or portion of the room.

While I have illustrated and described but one embodiment of my invention, it will be understood that various modifications, additions, omissions, and substitutions may be made in the device described without departing from the spirit and scope of the invention as defined by the following claims.

I claim as my invention:

1. In an electric heater, a casing provided with a perforated front, side and rear walls, and legs, a heater unit assembly comprising two vertical side rods, a perforated plate secured to the bottoms of the side rods and positioning them in the casing, a channelled bridging member supported on the side rods near the top and a channelled bridging member supported on the side rods near the bottom thereof, insulators supporters in slots in the bridging members, a heater element wire strung between the insulators of the upper and lower bridging members, a reflector provided with formed lugs at the top and bottom thereof serving to support the reflector on the vertical rods, a spring on each vertical rod cooperating with one of the bridging members to move it away from the other bridging member to maintain a tension on the heating element, a perforated cover supported by the casing and provided with openings to receive the vertical rods, and means to cooperate with threaded portions on the vertical rods to draw up the rods and secure the bottom plate against lugs on the casing.

2. In an electric heater, a casing provided with perforated front, side, and rear walls, and legs, a heater unit assembly comprising two vertical side rods, a perforated plate secured to the bottom of the side rods and positioning them in the casing, a channelled bridging member supported on the side rods near the top and a channelled bridging member supported on the side rods near the bottom thereof, insulators supported in slots in the bridging members, a heater element wire strung between the insulators of the upper and lower bridging members, a reflector provided with formed lugs at the top and bottom thereof serving to support the reflector on the vertical rods, a spring on each vertical rod cooperating with one of the bridging members to move it away from the other bridging member to maintain a tension on the heating element, a perforated cover supported by the casing and provided with openings to receive the vertical rods, means to cooperate with threaded portions on the vertical rods to draw up the rods and secure the bottom plate against lugs on the casing, and a guard extending across the front of the heater provided with portions extending through openings in the front of the casing and secured to the vertical rods.

FREDERICK B. ADAM.